(12) United States Patent
Clayton et al.

(10) Patent No.: US 6,644,848 B1
(45) Date of Patent: Nov. 11, 2003

(54) PIPELINE MONITORING SYSTEMS

(75) Inventors: Hugh R Clayton, Canterbury (GB); Raiko Milanovic, Heidelberg (DE)

(73) Assignee: ABB Offshore Systems Limited, Bristol (GB)

( * ) Notice: Subject to any disclaimer, the term of this patent is extended or adjusted under 35 U.S.C. 154(b) by 0 days.

(21) Appl. No.: 09/701,987

(22) PCT Filed: Aug. 6, 1999

(86) PCT No.: PCT/GB99/01812
§ 371 (c)(1),
(2), (4) Date: Feb. 23, 2001

(87) PCT Pub. No.: WO99/64781
PCT Pub. Date: Dec. 16, 1999

(30) Foreign Application Priority Data

Jun. 11, 1998 (GB) .............................................. 9812465

(51) Int. Cl.⁷ .......................... G01N 21/00; G01N 1/14; G01N 13/10; G01J 1/04; G01J 1/42; G01J 5/08
(52) U.S. Cl. .......................... 374/7; 374/140; 374/131; 374/148; 73/61.62; 250/227.14
(58) Field of Search ............................ 374/4–6, 7, 136, 374/140, 143, 130–131, 110–112, 147–148, 208; 250/227.14, 227.11; 73/61.62

(56) References Cited

U.S. PATENT DOCUMENTS

| | | | | |
|---|---|---|---|---|
| 3,753,091 A | * | 8/1973 | Daspit ......................... | 324/54 |
| 3,913,378 A | * | 10/1975 | Hausler ....................... | 73/15 R |
| 4,812,645 A | * | 3/1989 | Griffiths ...................... | 250/227 |
| 4,872,762 A | * | 10/1989 | Koshihara et al. ............. | 374/5 |
| 4,912,683 A | * | 3/1990 | Katahara et al. .............. | 367/25 |
| 4,990,851 A | * | 2/1991 | Spies ......................... | 324/240 |
| 5,171,524 A | * | 12/1992 | Niolon ........................ | 422/53 |
| 5,533,572 A | * | 7/1996 | Brady et al. ................. | 166/250.05 |
| 6,194,902 B1 | * | 2/2001 | Kuo et al. .................... | 324/637 |
| 6,281,489 B1 | * | 8/2001 | Tubel et al. .................. | 250/227.14 |
| 2002/0038199 A1 | * | 3/2002 | Blemel ........................ | 702/183 |

FOREIGN PATENT DOCUMENTS

| | | | | |
|---|---|---|---|---|
| EP | 0333100 | * | 9/1989 | ..................... 374/5 |
| JP | 0026952 | * | 2/1991 | ..................... 374/4 |
| JP | 03158728 A | * | 7/1991 | ................. 374/117 |
| JP | 404009651 A | * | 1/1992 | ..................... 374/4 |
| JP | 1048173 | * | 2/1998 | .......... G01N/17/02 |
| JP | 20000067660 A | * | 3/2000 | ........... H01B/11/00 |

\* cited by examiner

*Primary Examiner*—Diego Gutierrez
*Assistant Examiner*—Gail Verbitsky

(57) ABSTRACT

An oil pipeline, which connects a Christmas tree at its lower end to an oil rig at its upper end, is fitted with a stainless steel tube sheathed telecommunications grade optical fiber, forming part of a distributed temperature measurement device, such as to be in thermal contact with the oil flowing along the pipeline. Also fitted to respective ones of three discrete positions on the pipeline are ultrasonic deposit thickness measurement devices, the one nearest of which to the Christmas tree is a few hundred meters downstream from a position where preliminary studies of the pipeline system have indicated that deposits are likely to form during oil production. A computer, located on the oil rig, is connected to be able to provide control over and to receive measurement signals from the temperature measurement devices and the deposit thickness measurement devices. A model of at least deposit deposition stored in the computer is revised in response to these signals. The model includes an approximation of the temperature, the pressure and the viscosity and flow patterns of the oil along the length of the pipeline and, from these parameters, an estimation of the nature and quantity or rate of deposit deposition along the length of the pipeline.

16 Claims, 4 Drawing Sheets

PIPELINE MONITORING SYSTEMS

BACKGROUND OF THE INVENTION

This invention relates to a pipeline monitoring system and, more particularly, to pipeline monitoring systems including a processing device designed to derive an estimation of deposit deposition along the pipeline.

In producing hydrocarbons from an underwater well or bore hole, it is usual to place a "christmas tree", which contains a number of flow control valves, on the sea or lake-bed at the top of the well or bore hole, and to connect the lower end of a production pipeline to that christmas tree and to connect the upper end of the production pipeline, via a riser, to a ship, rig or shore based hydrocarbon collection facility. Production of oil from such wells introduces considerable engineering problems because the cooling that occurs as oil travels through the pipeline along the sea or lake bed may cause scales, asphaltenes, waxes and hydrates to come out of solution and form solid particles. These particles may form solid deposits on the inner walls of the pipeline, or agglomerate to form slurries or plugs. As amounts of deposits, plugs and/or slurries within the pipeline increases, the operational effectiveness of the pipeline is reduced. If the deposits were allowed to build up over time, oil flow through the pipeline would become progressively more restricted until insufficient energy existed within the reservoir or pipeline system to economically extract the oil.

To reduce the rate of cooling and hence the rate of particle formation, it is common to thermally insulate the pipeline by jacking it with a thermally insulating material. It is known also to contain the pipeline in a bundle with pipelines along which hot fluids, such as hot water or reservoir fluids from a well or wells at a higher temperature, relying on thermal conduction from the hot fluid pipelines to heat the cooler pipeline or pipelines. This bundle will usually also be thermally insulated. Techniques used to insulate such bundles can involve the use of air or nitrogen, which may be trapped in a rock wool or glass beads which are packed in the spaces between the pipelines and an outer carrier pipe in which the pipelines are contained. Alternatively a vacuum may be maintained in such an outer carrier pipe. With these schemes, the conduction of heat from the pipeline to the surrounding body of water is reduced, providing generally greater oil temperatures, with particle formation and hence deposition rates being accordingly reduced.

To reduce deposition rates further, deposit inhibitor chemicals often are continually or periodically injected into the pipeline at the well head, by way of the christmas tree, or downstream of the well-read by way of a manifold arrangement. The cost of the infrastructure required for chemical injection and the operational costs of providing the necessary chemicals are each considerable costs.

Nevertheless, deposits will build up which, if a pipeline is to he maintained in use will need to be removed. A technique commonly used in such deposit removal involves the periodic insertion of mechanical pigs into the lower end of the pipeline, for later removal at the upper end. This technique is used both to remove any deposit formation that may have built up and as a preventative measure before signification deposits appear although it can be disruptive and/or expensive.

As the increased resistance to flow offered by deposits ill a pipeline can be very costly in terms of production rates obtainable, it would seem to be best to carry out mechanical pigging and/or chemical solvent injection at intervals calculated to be sufficient to prevent blockage or severe flow restriction being caused by deposit formation. However, because the condition of tie deposits within the pipeline is so difficult to ascertain, deposit removal is usually carried out more frequently than the calculated frequency, as the cost of pipeline replacement is far greater than the costs involved with deposit removal. This procedure reduces the probability of blockage or severe flow restriction occurring to and acceptable level.

Therefore, it is desirable to monitor the formation of deposits in the pipeline. U.S. Pat. No. 3,913,378 proposes monitoring deposit formation by measuring temperature differential across the wall of a pipe, and across the interface between the flowing fluid and the pipe. However, this system incorporates thermocouples embedded in the wall of the pipe and inserted in the bore of the pipe. This is impractical for the purpose of monitoring pipelines of hydrocarbon wells.

SUMMARY OF THE INVENTION

In accordance with a first aspect of this invention, a system for monitoring a pipeline comprises a processing device arranged to receive temperature measurement signals from a distributed temperature measurement means associated including at least one optical fibre with the pipeline, and being designed to derive from those signals an estimation of deposit deposition at at least one position along the pipeline.

The processing device may contain a model of at least deposit deposition on inner walls of the pipeline.

The model preferably relates to deposit type and to deposit thickness.

The model may comprises a series of equations, which may be polynomial equations, or may be a look-up table or a number of associated look-up tables, stored or otherwise carried within the processor means. The processor means may be a general purpose computer, a computer system used also for other tasks, application specific computer hardware including a processor, or any other type of processor means.

The pipeline may be an underwater hydrocarbon pipeline, a cold climate pipeline such as an arctic oil pipeline, or maybe any other type of pipeline used to carry fluid at a temperature greater than the ambient temperature where cooling of the fluid may be detrimental to its transportation or its value.

The term deposit thickness will be understood to refer to deposits which have ambiguous boundaries with fluid flowing in the pipeline as well as those which have clear and defined boundaries with the fluid. In the former case, the deposit deposition measurement signals may communicate an approximation of thickness which corresponds to a boundary which an operator dictates is of interest, such as the boundary, between deposits having less than and deposits having greater than a particular viscosity. In some cases, it may be preferred to treat the fluid and the deposits as the same class of material and determine boundaries only on the basis of such characteristics as viscosity.

The term distributed temperature measurement means will be understood to include, in addition to apparatus which can measure temperature in a truly distributed sense, apparatus which can measure temperature at points along the pipeline which are a small distance apart. These points may he although are not necessarily, between 1 m and 100 m apart. The more important requirements of the temperature measurement means may be accuracy of measurement and, particularly, coverage with respect to the length of the pipeline rather than resolution of temperature measurement along (a small length of the pipeline.

The temperature measurement means preferably includes one or more optical fibres associated with the pipeline, in which case the or each optical fibre may be sheathed in a stainless steel tube. The or at least one optical fiber may be located within the pipeline, in which case the optical fiber or fibres may be attached to the inner wall of the pipeline periodically along its or their length.

Alternatively, the or at least one optical fibre is located adjacent the outside wall of a pipe forming part of the pipeline, in which case the optical fibre or fibres are preferably located between the pipe and a corrosion preventing layer.

The temperature measurement means may further include, advantageously, means to detect characteristics of a laser light pulse back scatted by the or each fibre, and means to provide therefrom said temperature measurement signals.

In accordance with a preferred feature, the processing device is also arranged to receive and designed to derive an estimation of deposit deposition from pressure measurement signals provided by a pressure measurement means arranged to determine fluid pressure at at least one location within the pipeline.

In accordance with another preferred feature, the processing device is also arranged to receive and designed to drive an estimation of deposit deposition from deposit thickness measurement signals provided by a thickness measurement means including at least one measurement transducer located at a discrete position along the pipeline.

Here, the measurement transducer may be associated with a measurement device, and the thickness measurement means may including at least two such measurement devices. In this case, tile thickness measurement meals may comprise between two and ten thickness measurement devices located at discrete positions along the pipeline, which is preferably three, four or five thickness measurement devices. For optimum utility, the or at least one measurement transducer is located at a position along the pipeline near which deposits are expected to form during use.

In accordance with a preferred aspect of the invention, the or each measurement transducer is an ultrasonic transducer arranged to transmit ultrasonic pulses into tile pipeline. Here, the thickness measurement means may be operable to detect a distance between a boundary between the pipe and a deposit and a boundary between the deposit and a hydrocarbon flowing along tile pipeline at the or each discrete position. In this case, the thickness measurement means may he operable also to detect a distance between the boundary of the pipe and the deposit and a boundary between two different types of deposit.

In such ultrasonic systems, a determined fraction of an acoustic signal reflected by a deposit may be used to determine the deposit type.

In accordance with a second aspect of this invention, apparatus for obtaining an indication of the nature of deposits along a pipeline comprises means for measuring the thickness of such deposits at at least one discrete point along the pipeline; means for measuring a pipeline which means incoluding at least one optical fibre and means for using the two measurements to estimate the thickness of the deposits at different positions along the pipeline.

BRIEF DESCRIPTION OF THE DRAWINGS

Embodiments of this invention will now be described by way of example only with reference to the accompanying drawings of which.

DETAILED DESCRIPTION OF THE PREFERRED EMBODIMENT

Figure 1:
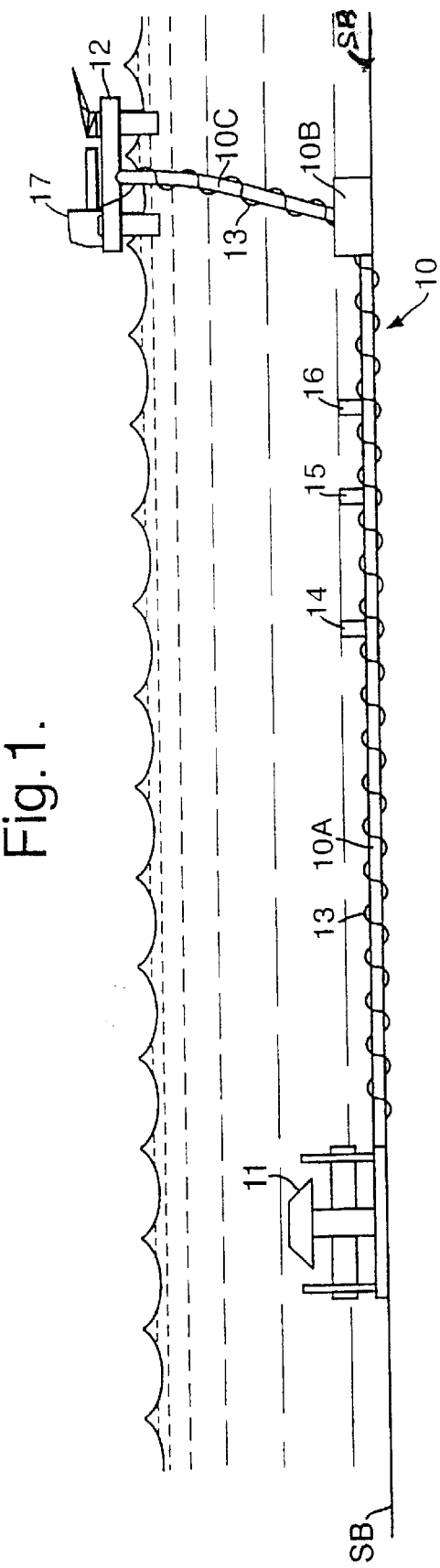
FIG. 1 is a pipeline monitoring system in accordance with this invention installed on an underwater hydrocarbon pipeline.

Referring to FIG. 1, the underwater hydrocarbon pipeline 10 is shown connecting a Christmas tree 11 at its lower end to a hydrocarbon collection facility, in the form of an oil rig 12, at its upper end. For most of its length, the pipeline 10 comprises a standard subset oil pipeline 10A which rests on the seabed SB. A riser base 10B connects the pipeline 10A to a riser 10C, which extends from the seabed SB to the oil rig 12. In this embodiment, the pipeline 10A is 30 km long and comprises a steel pipe sheathed in concentric layers of a corrosion preventing material such as polyethylene or polyurethane, a thermal insulation material, concrete and bitten, in that order. The pipeline thus far described is conventional. However, in accordance with this invention the pipeline 10 further includes a telecommunications grade optical fibre 13 sheathed in a stainless steel tube.

The optical fibre 13 is in thermal contact with the hydrocarbons flowing along the pipeline 10. The optical fibre 13 may be located within the pipeline 10, in which case it may be attached to the inner wall periodically along its length. Preferably, the optical fibre 13 is located between the pipe and the corrosion preventing layer. In this way, the temperature of the optical fibre will correlate with that of the steel pipe, which should, if the hydrocarbon temperature in a section or length or pipeline remains substantially constant, correspond closely to that of the hydrocarbons present in that section of the pipeline. In FIG. 1, the optical fibre 13 is schematically shown spiraling around and distant from the pipeline 10, although it will be appreciated that a high level of thermal contact is present between the hydrocarbon in the pipe 10 and the optical fibre 13.

Also associated with the pipeline 10 are first, second and third thickness measurement devices, indicated at 14, 15 and 16 respectively, each including an unshorn ultrasonic transducer. These thickness measurement devices, and their respective transducers, are located at three discrete positions on the pipeline, the one 14 nearest of which to the Christmas tree 11 is a few hundred metres downstream from a position where preliminary studies of the pipeline system have indicated that deposits are likely to form during oil production. The other devices 15 and 16 are suitably located downstream to make deposit thickness measurements representative of deposit thicknesses along the remainder of the pipeline.

A processing device or computer 17 is located on the oil rig 12, the computer 17 being connected both to die optical fibre 13 and to the thickness measurement devices 14, 15, 16 in such a way as to be able to provide control over and to receive signals from these arrangements. The computer 17 in conjunction with the optical fibre 13 may be considered as a distributed temperature measurement means, which is described in more detail below with reference to FIG. 2 The computer 17 in conjunction with the thickness measurement devices 14, 15, 16, may be considered as a thickness measurement means, which is described in more detail below with reference to FIG. 3. The computer 17 is divided up or partitioned so that a first part 17A is associated solely with the distributed temperature measurement means, a second part 17B is associated solely with the thickness measurement means, and a third part 17C is not associated particularly with either of these measurement means.

Figure 2:
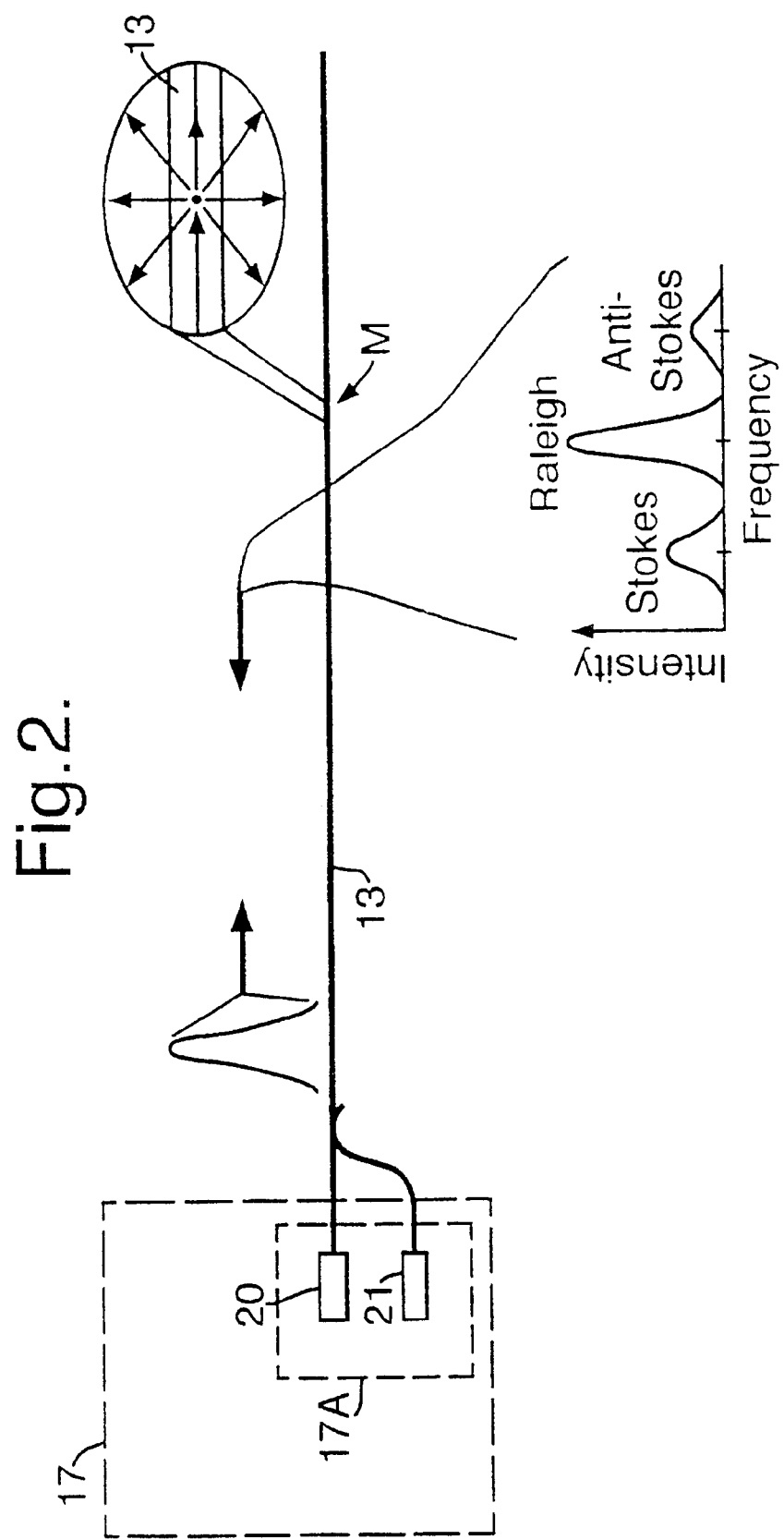
FIG. 2 is a schematic diagram of temperature measurement means forming part of the FIG. 1 system.

The operation of the distributed temperature measurement means comprising the optical fibre 13 and the first par 17A of the computer 17, will now be described in more detail with reference to FIG. 2, which schematically shows the principles used.

The hardware included in the first part 17A of the computer 17 includes a laser source 20, such as a laser diode, and a detection transducer 21, which are both optically connected with the optical fibre 13. Temperature measurement is carried out by energisation of the laser 20 to cause it to transmit a short high energy laser pulse down the optical fibre. At a given point in time after the time of laser pulse transmission, the laser light received at the detection transducer 21 contains information from which the temperature of the optical fibre at a measurement point M a distance from the computer 17 corresponding to half the distance laser light travels in that time can be determined. However, the received light also includes light scattered by molecular and density variations in structure of the optical fibre 13 at the measurement point M. This light is referred to as Rayleigh scattered light. Rayleigh scattering is temperature independent. Importantly, the received light also includes light scattered by vibration and rotation of the glass molecules of the optical fibre 13 at the measurement point. This type of scattering is referred to as Raman scattering.

Raman scattering produces two quantities of light, having central frequencies corresponding to the sum and difference frequencies respectively, which are caused by the mixing of the transmitted laser light with a Raman shift frequency. The quantity of light having the lower frequency is called the Stokes component and the quantity having the higher frequency is called the anti-Stokes component of Raman scattering. The temperature of the optical fibre 13 at the measurements point M is proportional to the ratio of a parameter of the anti-Stokes component to the Stokes component, which temperature can quite easily be determined by the part 17A of the computer 17. Determination of the temperature of the optical fibre 13 at many measurement points along its length can be performed within a relatively short space of time by examination of the light detected by the detection transducer 21 at times subsequent to the time of the laser pulse transmission corresponding to those measurement points M. A system suitable for use as this distributed temperature measurement means is the DTS 800—URN system produced by York Sensors Limited of Chandler's Ford, Hampshire, U.K.

Figure 3:
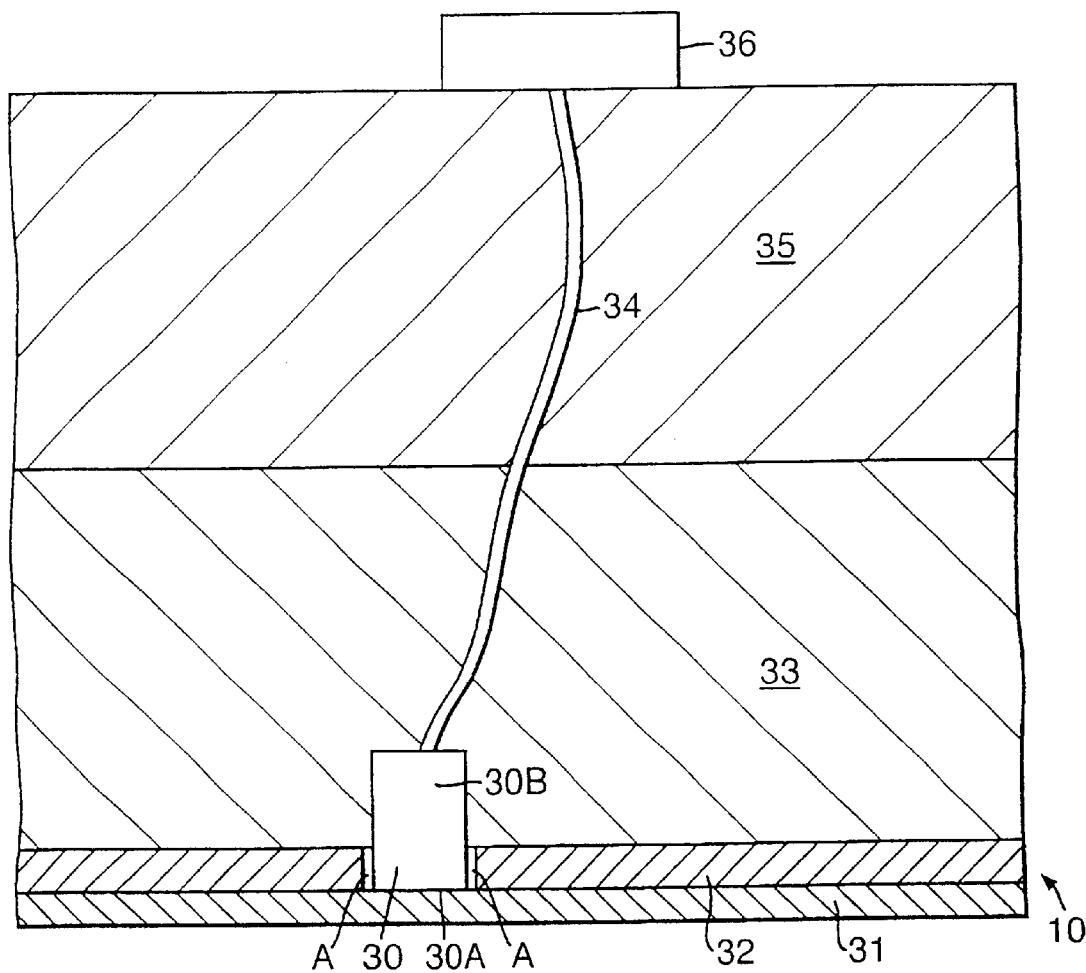
FIG. 3 is a schematic diagram of thickness measurement means forming pail of the FIG. 1 system.

The operation of a thickness measurement devices 14 will now be described with reference to FIG. 3, in which the pipeline 10 is shown fitted with an ultrasonic transducer 30. The transducer 30 is positioned with an active face 30A in full contact with an outermost surface of a steel pipe 31 of the pipeline 10. The transducer 30 is surrounded on faces perpendicular to the outermost surface of the pipeline 31 by a polyethylene sheath 32 providing a corrosion preventing function to the pipe 31 of the pipeline. The pipe 31 may be protected from the ingress of water between the transducer 30 and the sheath 32 by the use of a fluid sealing adhesive A to secure the transducer 30 against the pipe 31 and within the sheath 32.

An end 30B of the transducer 30 furthest from the pipe 31 is enclosed within a thermally insulating sheath or layer 33 of the pipeline 10, although a cable 34 extends through the layer 33 and through a concrete sheath or layer 35 to electrically connect the transducer 30 to a thickness measurement control device 36 attached to the outermost surface of the pipeline 10. The measurement control device 36, the cable 34 as id the transducer 30 together comprise the measurement device 14, which is the same as the measurement devices 15 and 16.

In measuring deposit thickness on the inner surface of the steel pipe 31, the control device 36 generates a high frequency pulse of short duration, which is communicated to the transducer 30 by the cable 34. The pulse energies the transducer 30 which consequently transmits into the steel pipe 31 an ultrasonic pulse having characteristics dependent on the shape and frequency of the electrical pulse and the transfer function of the transducer 30.

When the ultrasonic pulse encounters a boundary between first and second dissimilar materials, some of the energy of the pulse will continue travelling into the second material and some of the energy will be reflected back into the first material. Reflected ultrasonic energy is received by the ultrasonic transducer 30 causing it to oscillate and thus generate electrical signals, which are detected by the control means 36. By measuring the time delay between transmitting and receiving a pulse, the control means 36 can calculate the distance of the boundary from the transducer 30. The distances of boundaries between the second and a third material and between the third and a fourth material from the transducer 30 can also be determined in this way. The thickness of the wax layer is the most relevant measurement as waxes will be quite evenly distributed along the length of the pipeline 10. Scale deposits will tend to form ill local "pockets" along the length of the pipeline 10 and hydrates may form plugs from slurries rather than deposit. The layer thicknesses thus determined are transmitted by the control means, either periodically or only upon interrogation, to the computer 17.

The control means 36 may be able to calculate the fraction of the ultrasonic signal reflected by a boundary and from this determine or deduce the deposit type. This is achievable by application of the Fresnel formulae.

In this way, the second part of the computer 17, forming part of the thickness measurement means, is provided with deposit thickness information, including thickness information of each layer of deposits, for each of the thickness measurement devices 14, 15, 16.

Figure 4:
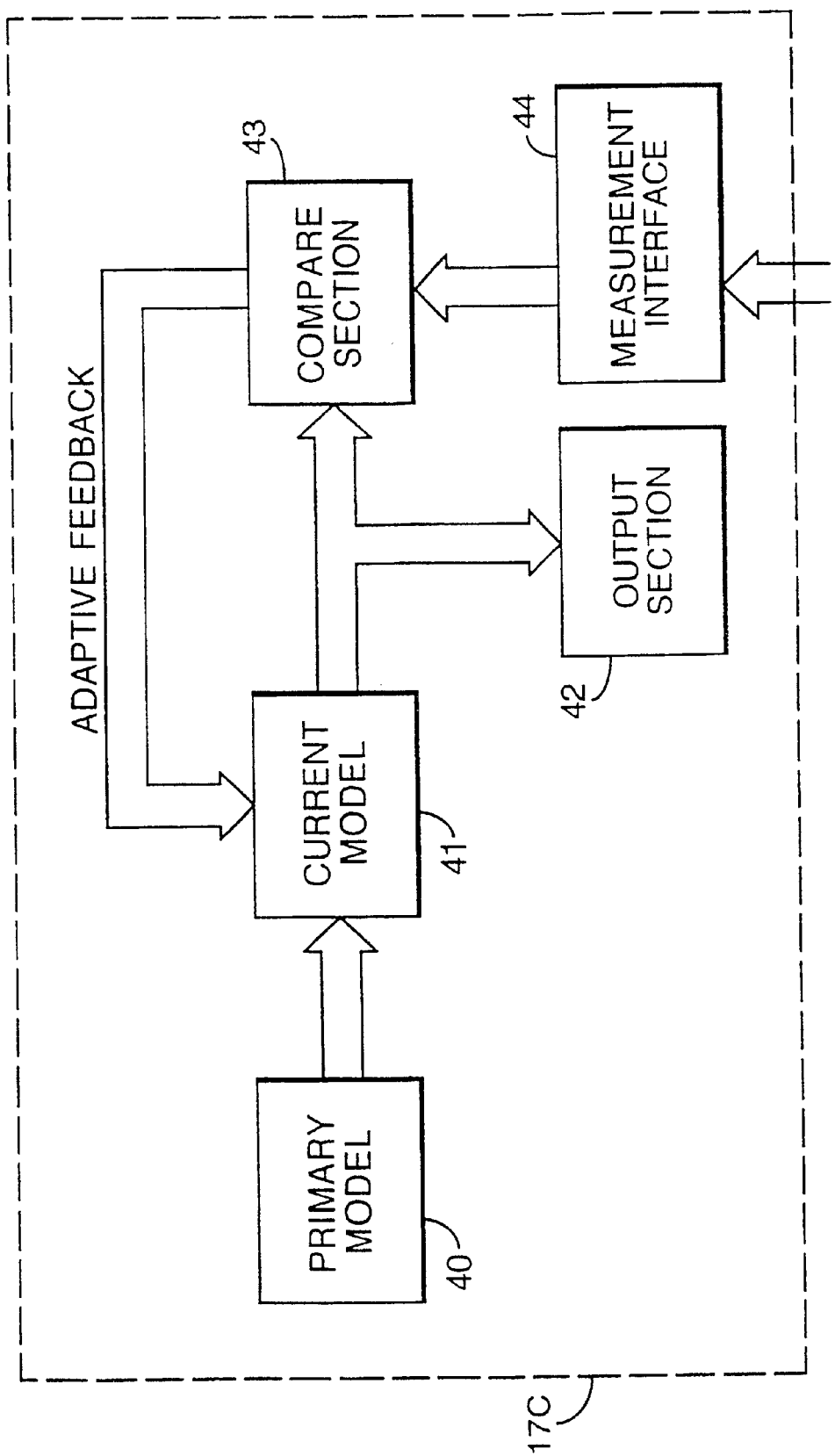
FIG. 4 is a schematic diagram showing in particular the organisation of models in a part of a computer of the pipeline monitoring system of FIG. 1.

Referring to FIG. 4, the third part 17C of the computer 17 is shown comprising a primary or initial model 40 connected to a current model 41, which is connected to an output section 42 and to a compare section 43. A measurements interface 44 is also connected to the compare section 43, which provides an adaptive feedback connection to the current model 41. The measurements interface 44 is arranged to receive data from the unshorn first and second parts 17A and 17B of the computer 17. How the current model 41 is provided and maintained is as follows.

Firstly, on installation of the monitoring system, the primary or the initial model 40 is used as the basis for conditions in the pipeline, and so is copied into the space occupied by the current model 41. The primary or initial model 40 is a model which is the best approximation of conditions in the pipeline 10 calculable from conditions aid system parameters present on installation of the pipeline 10. These conditions and parameters include measurements of hydrocarbon pressure at the Christmas Tree 11, pipeline length, pipeline diameter and altitude or depth at positions along its length, the chemical composition of the hydrocarbons being produced, the temperature of the hydrocarbons at the Christmas Tree 11, the flow-rate along the pipeline 10, and the amount of the thermal insulation present oil the pipeline 10. The primary model 40 thus constitutes the best approximation of the temperature, the pressure and the viscosity and flow patterns of the hydrocarbons along the length of the pipeline 10, and, from these parameters, an estimation of the nature and quantity or rate of deposit deposition along the whole length of or at a plurality of positions along the pipeline 10. Predictions of conditions akin to this primary model 40 are commonly made on installation of hydrocarbon pipelines in underwater locations so will be understood by the skilled person and need not be described in more detail here.

Once production of hydrocarbons from the well has heated the pipe to approximately the same temperature as the hydrocarbons flowing along, the associated portion of pipeline, i.e. a state of thermal equilibrium has been reached, a first modification of the current model 41 occurs. Thermal equilibrium can be detected by analysis of data provided by the temperature measurement means in that the temperature substantially ceases to increase when equilibrium has been or is close to being reached. Subsequent modifications of the revised model 42 occur at regular intervals.

At each modification, the parameters of the current model 41 are compared in the compare section 43 with the measured parameters provided by the first and second parts of the computer 17 at tile measurements interface 44. Where there is a difference between the measured and the modeled parameters, the current model 41 is revised to reflect a compromise between the measured and the modeled parameters. In revising the current model 41, the computer takes into account the effects that the temperature, the deposit thickness and the pressure at points along the pipeline 10 have on each other. Once the revision is complete, this current model 41 is provided again to the compare section 43 and to the output section 42, the later of which is analyzed by way of monitoring the condition of the pipeline 10.

Such analysis includes particularly an examination of deposit thickness along the length of the pipeline 10 as estimated by the computer 17 and stored in the current model 41 and the output section 42, which is representative of the actual deposit thickness along the length of the pipeline 10. The analysis may involve the comparison of the deposit thickness at a point along the pipeline with an alarm threshold thickness. Here, the alarm threshold thickness being exceeded could be used to indicate to an operator that some action is needed, or will be needed at some particular time in the future. Such action may include mechanical pigging or chemical injection, or may include controlling a device associated with the pipeline, such as a flow rate control valve forming part of the Christmas Tree 11.

Dependent on the chemical composition of the hydrocarbons being produced, an alarm threshold temperature may be provided to indicate to an operator that a critically low temperature is present at a particular part along the length of the pipeline 10. Such a feature is especially advantageous where particularly large amounts of deposits are precipitated from a hydrocarbon over a certain, relatively small, temperature drop. This feature, in conjunction with the deposit thickness comparison feature described above, allows an operator to optimize pigging and/or chemical injection with regard to cost and hydrocarbon production efficiency by the provision of information closely indicative of the condition of the pipeline 10.

The analysis may also include an examination of the temperature along the length of the pipeline 10. Analysis of this type may be of particular use when the pipeline 10 is shut-in, for example, during maintenance of process equipment associated with the pipeline 10. The risk of blockage caused by the increased hydrocarbon cooling resulting from a shut-in has heretofore necessitated shut-in times of conservatively short durations. By examining the temperature of the hydrocarbons along the length of the pipeline 10, an operator is able to increase the shut-in time to a point close to the critical time at which excessive deposits would have formed. Increasing the shut-in time in time in this way provides increased cost effectiveness of pipeline maintenance, and call give rise to greater operational flexibility.

Alternatively or in addition, the monitoring may comprise simply displaying conditions and parameters of the revised model graphically or numerically on, for example, a computer screen.

In a further improvement to the system measurement signals from a pressure measurement means (not shown) are used to provide more accurate models in the computer part 17C. Here, the pressure measurement means preferably include an optical fibre located within the pipeline 10. Including pressure measurements in the models in this way removes some uncertainty, inherent in the models, which is caused by estimation of parameters where measurement of those parameters is not possible or difficult to obtain.

Although the embodiment has been described with time of flight ultrasonic deposit thickness measurement devices being used in the thickness measurement means, this invention is not limited to such. Other thickness measurement means envisaged include transversal ultrasonic devices, which operate using shear wave transmission measurement, distributed differential pressure measurement devices, which operate to detect differences in the effective cross-sectional are of the pipeline 10 along its length, or heat flux sensor array measurement devices, which operate on the principle that deposits reduce heat flux from the pipeline fluid to the environment. Other devices envisaged are microwave devices which examine the characteristics of microwave frequency signals transmitted down the pipeline to determine its effective diameter, or nuclear attenuation measurement devices.

Although the temperature measurement means is preferably a fibre optic Ragman scattering based, these means need not rely on Raman scattering to provide temperature measurement signals, and not need used fibre optical cables at all nor need use fibre optic cables at all.

We claim:

1. A system for monitoring a pipeline, comprising: a distributed temperature measurement means including at least one optical fibre located within the pipeline for generating temperature measurement signals, said at least one optical fiber being located adjacent an outside wall of a pipe forming part of the pipeline, and being located between the pipe and a corrosion preventing layer; and a processing device for receiving the temperature measurement signals, and for deriving from the temperature measurement signals an estimation of deposit deposition at at least one position along the pipeline.

2. The system of claim 1, in which the processing device contains a model of at least deposit deposition on inner walls of the pipeline.

3. The system of claim 2, in which the model relates to deposit type and to deposit thickness.

4. The system of claim 1, in which the at least one optical fibre is sheathed in a stainless steel tube.

5. The system of claim 1, in Which the temperature measurement means further includes means for detecting characteristics of a laser light pulse back scattered by the at least one optical fibre, and means for providing the temperature measurement signals from the detecting means.

6. The system of claim 1, and further comprising a pressure measurement means associated with the pipeline for generating pressure measurement signals; and in which the processing device is also operative for receiving and deriving an estimation of deposit deposition from the pressure measurement signals to determine fluid pressure at at least one location within the pipeline.

7. A system for monitoring a pipeline, comprising: a distributed temperature measurement means including at least one optical fiber associated with the pipeline for generating temperature measurement signals; a processing device for receiving the temperature measurement signals, and for deriving from the temperature measurement signals an estimation of deposit deposition at at least one position along the pipeline; and a thickness measurement means associated with the pipeline for generating thickness measurement signals; and in which the processing device is also operative for receiving and deriving an estimation of deposit deposition from the thickness measurement signals, said thickness measurement means including at least one measurement transducer located at a discrete position along the pipeline.

8. The system of claim 7, in which the at least one measurement transducer is associated with a measurement device, and the thickness measurement means includes at least two of said measurement devices.

9. The system of claim 8, in which the thickness measurement means comprises between two and ten of said thickness measurement devices located at discrete positions along the pipeline.

10. The system of claim 9, in which the thickness measurement means comprises between three and five of said thickness measurement devices.

11. The system of claim 7, in which the at least one measurement transducer is located at a position along the pipeline near which deposits are expected to form during use.

12. The system of claim 11, in which the at least one measurement transducer is an ultrasonic transducer arranged to transmit ultrasonic pulses into the pipeline.

13. The system of claim 12, in which the thickness measurement means is operative for detecting a distance between a boundary between the pipeline and a deposit, and a boundary between the deposit and a hydrocarbon flowing along the pipeline at said discrete position.

14. The system of claim 13, in which the thickness measurement means is operative for detecting a distance between the boundary of the pipeline and the deposit, and a boundary between two different types of deposit.

15. The system of claim 13, in which the processing device contains a model of at least deposit deposition on inner walls of the pipeline, and in which the model relates to deposit type and to deposit thickness, and in which a determined fraction of an acoustic signal reflected by a deposit is used to determine the deposit type.

16. Apparatus for obtaining an indication of a nature of deposits along a pipeline, comprising: means for measuring a thickness measurement of the deposits at at least one discrete point along the pipeline; means for measuring a temperature variation measurement along a length of the pipeline; and means for using the two measurements to estimate a thickness of the deposits at different positions along the pipeline.

* * * * *